United States Patent [19]

Matsumoto

[11] Patent Number: 5,687,842
[45] Date of Patent: Nov. 18, 1997

[54] COMPACT DISC LOWER CASE

[75] Inventor: Satoshi Matsumoto, Onsen-gun, Japan

[73] Assignee: Fuji Seiki Co., Ltd., Osaka, Japan

[21] Appl. No.: 689,716

[22] Filed: Aug. 16, 1996

[30] Foreign Application Priority Data

Aug. 24, 1995 [JP] Japan ................... 7-216323

[51] Int. Cl.⁶ .................................................. B65D 85/57
[52] U.S. Cl. .......................... 206/308.1; 206/309; 206/312
[58] Field of Search .............................. 206/308.1, 309, 206/310, 312; 211/40, 41

[56] References Cited

U.S. PATENT DOCUMENTS

| | | | |
|---|---|---|---|
| 5,513,749 | 5/1996 | Simmons | 206/308.1 |
| 5,515,968 | 5/1996 | Taniyama | 206/310 |
| 5,542,531 | 8/1996 | Yeung | 206/308.1 |

Primary Examiner—David T. Fidei
Attorney, Agent, or Firm—Rabin, Champagne & Lynt, P.C.

[57] ABSTRACT

A lower case of a compact disc case is molded from a resin. The lower case comprises a rectangular bottom portion, upwardly extending lateral wall portions formed at a pair of opposite sides of the bottom portion, and lateral edge portions outwardly extending from the base portions of the lateral wall portions. To facilitate the installation and removal of a compact disc, the lateral wall portions have first recesses. The lateral edge portions have second recesses corresponding to the first recesses. The formation of the second recesses restrains the resin supplied to the bottom portion from being suddenly increased in flowability at the lateral edge portions at the time of molding. The formation of the second recesses reduces a difference in thickness between the bottom portion and the lateral edge portions. This results in substantial equalization of the shrinkage amounts of the bottom portion and the lateral edge portions at the time of molding.

11 Claims, 13 Drawing Sheets

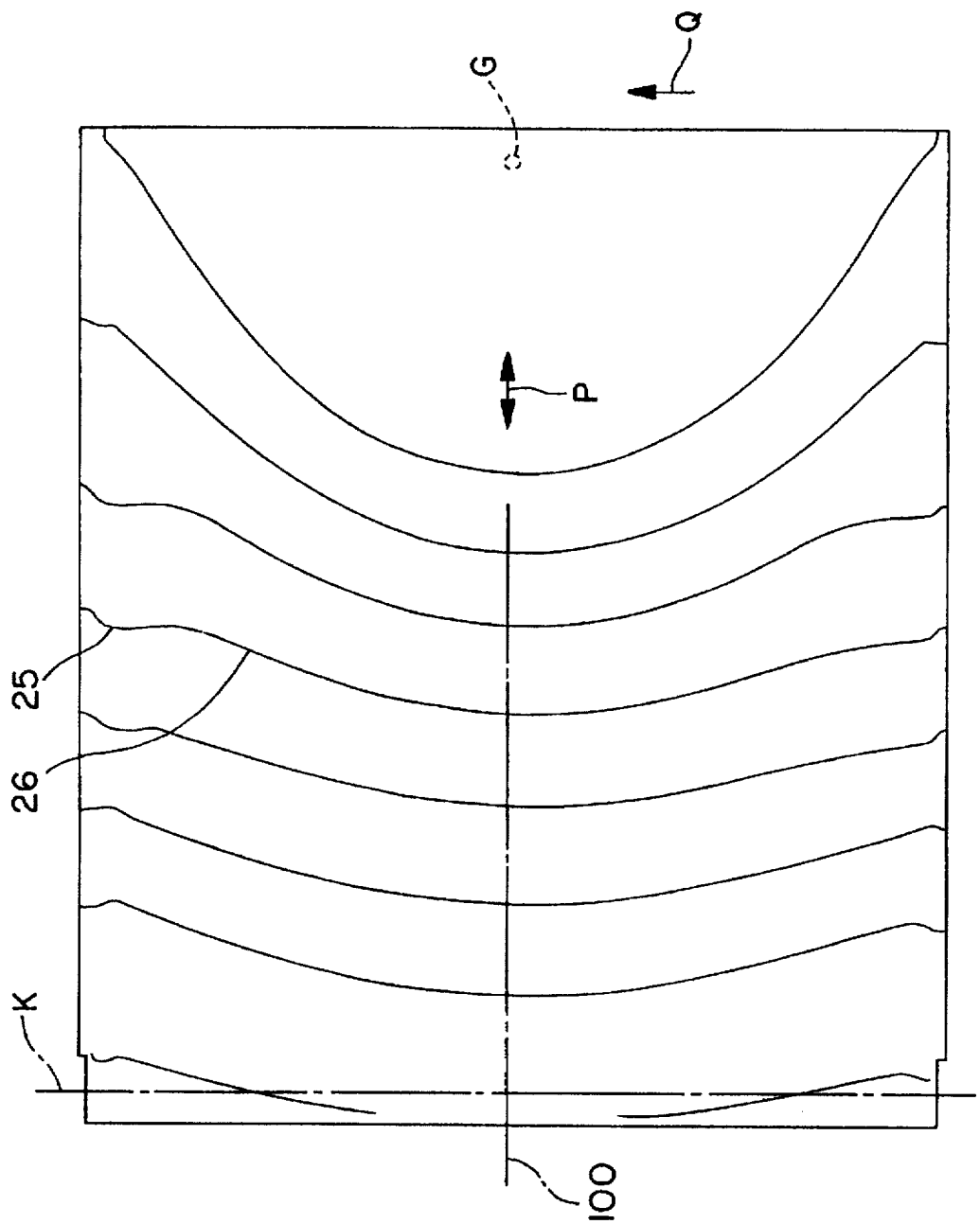

COMPACT DISC LOWER CASE

CROSS REFERENCE TO RELATED APPLICATION

This application claims priority benefits under 35 USC §119 of Japanese Patent Application Serial No. 7-216323, the disclosure of which is incorporated herein by reference.

BACKGROUND OF THE INVENTION

1. Field of the Invention

The present invention relates, in a resin molded compact disc case, to a lower case arranged to be relatively rotatably combined with an upper case.

2. Description of the Prior Arts

Referring to FIGS. 8 to 16, the following description will discuss prior arts. FIG. 8 shows the arrangement of a usual resin molded compact disc case. In FIG. 8, a case 1 comprises a lower case 2 and an upper case 3 pivotally supported at shaft holding holes 4 therein. The upper case 3 is openable in a manner rotatable around an axis of rotation K passing through the shaft holding holes 4.

The lower case 2 houses a tray 8 provided substantially at the center thereof with a disc engaging portion 7. The disc engaging portion 7 is to hold a compact disc 5 by fitting a center hole 6 thereof on the disc engaging portion 7. Thus being held in the lower case 2 through the disc engaging portion 7, the compact disc 5 is housed in the case 1.

The lower case 2 is provided at both lateral sides thereof in the direction perpendicular to the axis of rotation K with lateral wall portions 9 for receiving the tray 8. The lateral wall portions 9 are provided substantially at the centers thereof with recesses 10 which enable an user to readily apply his or her fingers to the compact disc 5 when it is intended to remove the disc 5 housed in the tray 8 therefrom. Each of the lower case 2 and the upper case 3 is generally made of a transparent resin.

FIG. 9A and FIG. 9B are a plan and a side view, respectively, of the lower case 2 in FIG. 8. Shown in FIG. 9A is a gate position G through which a molten resin is to be injected when molding the lower case 2. In FIG. 9A, the gate position is located on the outer side (i.e., underside) of a bottom portion 17 and in the vicinity of the center of the side thereof which is parallel with the axis of rotation K and remote from the shaft holding holes 4.

FIG. 10 and FIG. 11 are a section view taken along either of the 10—10' in FIG. 9B and a section view taken along the line 11—11' in FIG. 9B, respectively. FIG. 12 is a section view, taken along the line 11—11' in FIG. 9B, of the case 1 in which the tray 8 and the compact disc 5 are housed in the lower case 2 with the upper case 3 closed. As shown in FIG. 10 to FIG. 12, the lower case 2 is often provided at each lateral edge portion 16 thereof with a downwardly projecting portion 12.

To enable an user to readily apply his or her fingers to the disc 5 when it is intended to be removed from the lower case 2, each of the recesses 10 is formed as if cut off slantwise from the lateral edge portion 16 to the peripheral edge of the tray 8 as shown in FIGS. 11 and 12.

Meanwhile, it has recently been tried to shorten the molding cycle or to reduce the thickness of the bottom portion 17 in order to make the lower case lightweight. When it is intended to reduce the thickness of the bottom portion 17 from t1 as shown in FIG. 15A to t2 as shown in FIG. 15B. In view of the structure of the case as shown in FIG. 12, it is not possible to change the depth of the case 1, i.e., the size a from the upper end of the lateral wall portion 9 to an inner bottom surface 15 and the size h from the upper end of the lateral wall portion 9 to the lowermost end of the projecting portion 12 are unchangeable. Accordingly, when it is intended to reduce the thickness of the lower case, it is inevitable to reduce the thickness of the bottom portion 17 by increasing the distance between an outer bottom surface 11 and the lowermost end of the projecting portion 12 from c1 to c2 as shown in FIGS. 15A and 15B.

As understood from the combined state shown in FIG. 12, unlike the bottom portion 17, the lateral wall portions 9 cannot be reduced in thickness in view of the fitness to the upper case 3 and the tray 8 and the strength required for holding the upper case 3 and the tray 8.

When injection-molding the lower case 2 with the bottom portion 17 reduced in thickness in the manner abovementioned, a molten resin at a high temperature is injected through a gate 20 to a cavity 21, which corresponds to the lower case 2, formed by a stationary molding plate 18 and a movable molding plate 19 as shown in FIG. 13. After cooled in a predetermined period of time, the mold is opened such that the movable molding plate 19 is removed together with a molded article from the stationary molding plate 18. Finally, as ejected by a ejector (not shown), the molded article is released and taken out from the movable molding plate 19.

However, such a molded article is disadvantageous in that the molded lower case 2 presents a defective appearance such as warping, weld-lines and the like due to the reduction in thickness of the bottom portion 17. The mechanisms for generating warping and weld-lines will be set forth in the following items 1) and 2), respectively.

1) In the molding process, the temperature of the stationary molding plate 18 from which a molten resin at a high temperature is injected, is generally higher than that of the movable molding plate 19. According as the molding cycle is shortened, the cooling time goes shorter, and therefore, the difference in temperature between the mold plates 18 and 19 increases.

When the difference in temperature between the mold plates 18, 19 is great at the time of molding, the resin surface in contact with the movable mold plate 19 lower in mold temperature, is beforehand cooled and solidified as restrained from being shrunk by the core. On the other hand, the resin surface in contact with the stationary molding plate 18 higher in mold temperature, is solidified behindhand as not restrained from being shrunk, and then presents a molding shrinkage after the mold has been opened.

Particularly, as the thickness t of the bottom portion 17 is reduced as shown in FIG. 15B, the projecting amount and thickness of each projecting portion 12 are relatively increased as compared with the thickness t and besides, the projecting portion 12 projects further to the stationary mold plate 18 higher in temperature (See FIG. 13). As a result, the difference in shrinkage between the bottom portion 17 and each projecting portion 12 becomes greater.

More specifically, a projecting resin portion 22 greatly projecting toward the stationary molding plate 18 in FIG. 13, is solidified behindhand after the mold has been opened. Accordingly, the shrinkage of the projecting resin portion 22 becomes great. Thus, as shown in FIG. 14, the lower case 2 presents a defect in appearance in that the bottom portion 17 inwardly projects and warps at its portion corresponding to the recesses 10 of the lateral wall portions 9. As mentioned earlier, according as the lower case 2 is relatively reduced in thickness and as the molding cycle is relatively shortened, such a phenomenon appears more remarkably.

On the other hand, no warping takes place in the bottom portion 17 at the other portions corresponding to the lateral wall portions 9 having a predetermined height where no recesses 10 are formed, because the presence of the lateral wall portions 9 works to prevent such warpings due to difference in shrinkage.

2) Also, in the molding process, the molten resin injected through the gate position G in FIG. 9, flows from the gate position G into the molding cavity as if describing arcs around the gate position G, as shown in FIG. 16. When flows of the molten resin reach from the bottom portion 17 to branch portions where the flows branch into the lateral edge portions 16 and the lateral wall portions 9 each having a thickness relatively thicker than that of the bottom portion 17, the flowing space of the molten resin gets suddenly large. Thus, the molten resin is suddenly increased in flowability from the branch portions. Accordingly, the lateral wall portions 9 and the lateral edge portions 16 are so rapidly charged with the molten resin that overflowing molten resin is pushed back toward the bottom portion 17.

Then, as shown in FIG. 16, a molten resin 25 thus pushed back comes into collision with a molten resin 26 which is advancing, as if describing arcs, in the bottom portion 17 from the gate position G. This produces weld-lines 27, which spoil the external appearance of the case. According as the thickness of the bottom portion 17 is made smaller than that of each of the lateral wall portions 9 and the lateral edge portions 16, such a phenomenon that an overflowing molten resin is pushed back from the lateral edge portions 16 toward the bottom portion 17, occurs more remarkably and the weld-lines appear much closer to the center in the direction parallel with the axis of rotation K.

SUMMARY OF THE INVENTION

It is an object of the present invention to provide, in a compact disc case, a lower case which is prevented from being damaged in appearance due to a reduction in thickness thereof.

To achieve the object above-mentioned, the present invention provides, as an embodiment, a lower case of a compact disc case, which is to be molded by injecting a molten resin through a predetermined gate position and which has an axis of rotation around which an upper case is rotatably supported, and this lower case is characterized by comprising:

a rectangular bottom portion;

a pair of upwardly extending lateral wall portions respectively formed at a pair of sides, out of the four sides of the bottom portion, extending in the direction perpendicular to the axis of rotation;

outwardly projecting lateral edge portions formed at the pair of sides of the bottom portion;

first recesses formed in the lateral wall portions at predetermined positions thereof, the first recesses being concaved such that the top ends thereof substantially reach an upper face of the bottom portion; and at least one second recess formed in at least one portion out of base portions of the lateral wall portions and the lateral edge portions, each of the lateral edge portions including a projecting portion which downwardly projects lower than the bottom portion.

The arrangement above-mentioned produces the following effects. In prior art, flows of a molten resin injected through the gate position set in the bottom portion, branch into the lateral wall portions and the lateral edge portions and fill up there. When it is tried to reduce the bottom portion in thickness, the passage of the resin after branched is suddenly expanded. Thus, the resin tends to be excessively increased in flowability. This produces a supplied resin pushing-back phenomenon, and contributes to the occurrence of weld-lines.

According to the embodiment above-mentioned, however, the second recess is formed in at least one portion out of the base portions of the lateral wall portions and the lateral edge portions. This restrains the resin passage from being suddenly expanded, thus restraining the supplied resin from being suddenly increased in flowability at the lateral wall portions and the lateral edge portions. Such a restraint of flowability imparts a flowing resistance to the resin liable to be pushed back toward the bottom portion. This restrains the molten resin from overflowing on the bottom portion. Thus, the bottom portion can be reduced in thickness with no defective appearance of the formation of weld-lines thereon. As a result, there can simultaneously be a lightweight design, a reduction in resin consumption and shortening the molding cycle achieved.

According to a preferred embodiment of the present invention, the lower case of a compact disc case is characterized in that the second recess includes a recess formed in a predetermined part of one of the lateral edge portions at its position corresponding to one of the first recess.

According to the arrangement above-mentioned, the second recess is formed in one of the lateral edge portions at its position corresponding to one of the first recesses formed in the lateral wall portions. This reduces a difference in thickness between the bottom portion and the lateral edge portions. This eliminates a difference in shrinkage between the bottom portion and the lateral edge portions at the time of molding due to the difference in thickness therebetween. As a result, the bottom portion can be reduced in thickness with no defective appearance of warping. Further, there can simultaneously be a lightweight design, a reduction in resin consumption and shortening the molding cycle achieved.

BRIEF DESCRIPTION OF THE DRAWINGS

FIG. 5 is a schematic plan of the bottom portion illustrating the flow of a molten resin at the time of molding;

Each of FIG. 6A, FIG. 6B, FIG. 6C

Each of FIG. 7A, FIG. 7B

Each of FIG. 15A and FIG. 15B is a section view corresponding to the section taken along the line 11—11' in FIG. 9B, in which FIG. 15A shows the state in which the bottom portion is not yet reduced in thickness and FIG. 15B shows the state in which the bottom portion has been reduced in thickness.

DETAILED DESCRIPTION OF PREFERRED EMBODIMENTS

The following description will discuss preferred embodiments of the present invention with reference to attached drawings.

Figure 2:
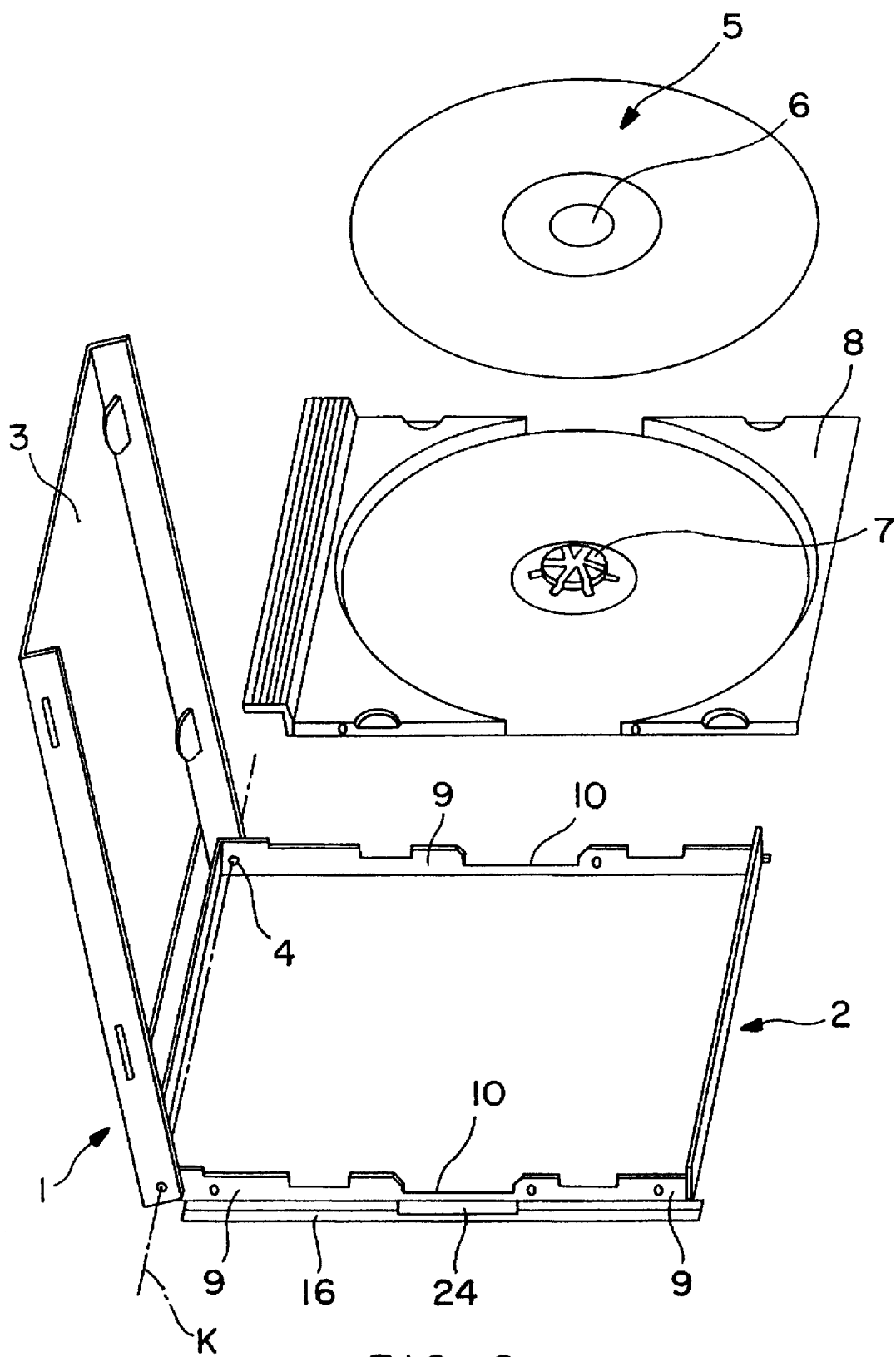
FIG. 2 is an exploded perspective view schematically illustrating the arrangement of the compact disc case.

Referring to FIG. 2, a compact disc case 1 including a lower case of the present embodiment, comprises a box-like lower case 2 which is low in height and the top of which is opened, and an upper case 3 connected thereto in a manner rotatable around an axis of rotation K set at one end of the lower case 2. The lower case 2 is opened/closed by the upper case 3 being rotated around the axis of rotation K.

The lower case 2 is arranged to house a tray 8 for holding a compact disc 5 having a center hole 6. The tray 8 is provided at the center thereof with a disc engaging portion 7 to hold the compact disc 5 with the center hole 6 being fitted on the disc engaging portion 7.

Figure 3A:
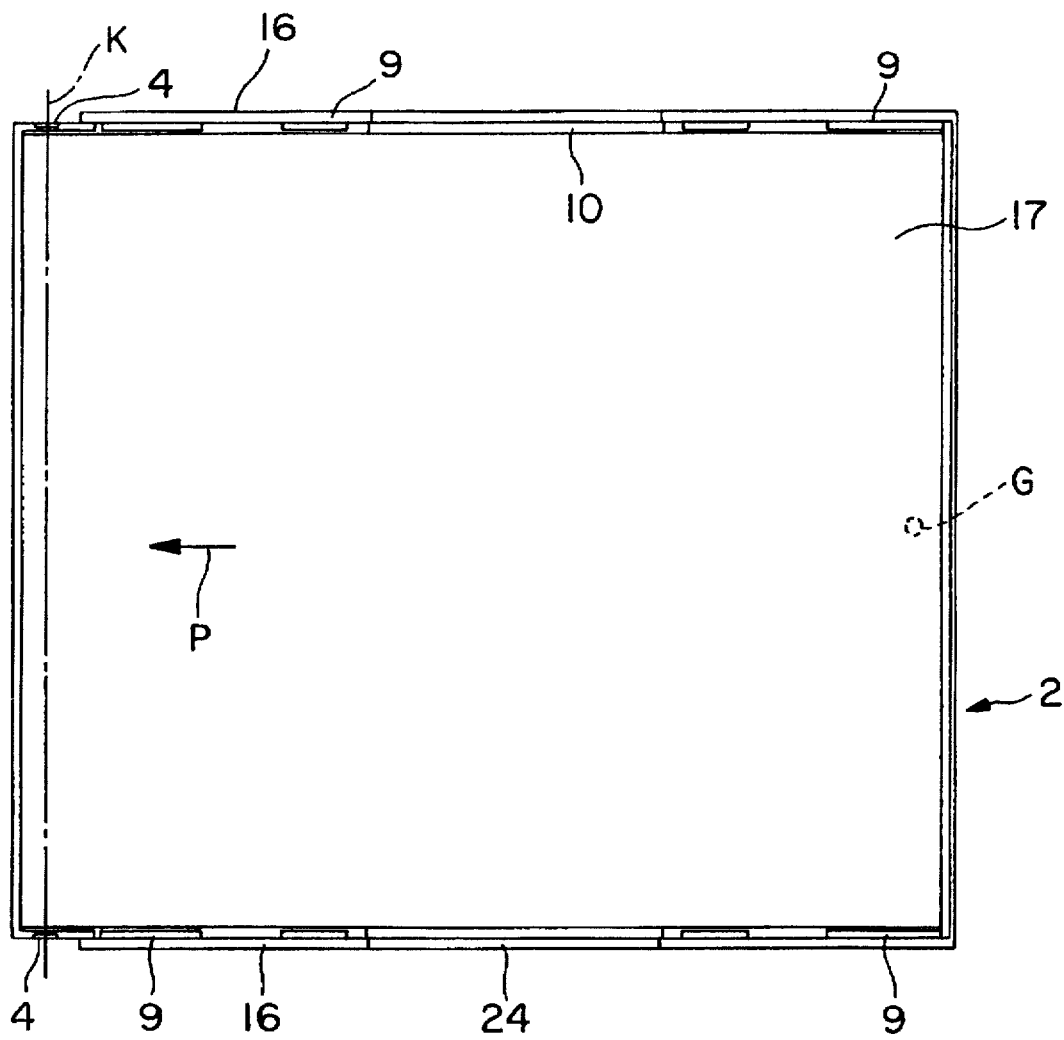
FIG. 3A is a plan of the lower case.
Figure 3B:
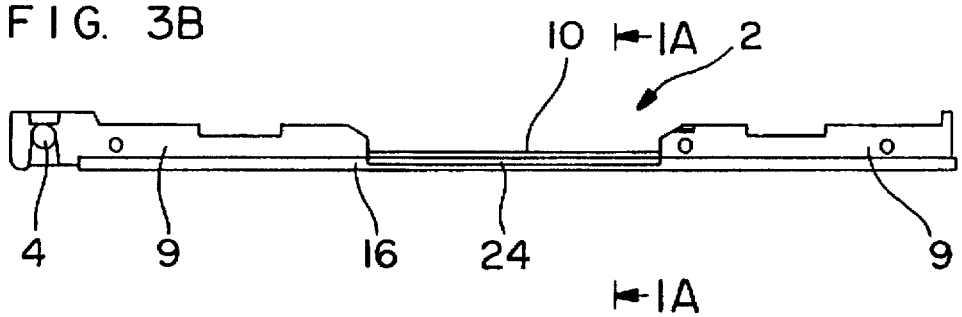
FIG. 3B is a side view of the lower case.

Referring to FIG. 3A, FIG. 3B and FIG. 4, the lower case 2 comprises (i) a bottom portion 17 rectangular in plan, (ii) lateral wall portions 9 respectively formed at a pair of opposite sides parallel with a direction P of the bottom portion 17 (See FIG. 3A) and (iii) lateral edge portions 16 outwardly extending from the pair of sides above-mentioned.

The direction P extends, on the bottom portion 17, at right angles to the axis of rotation K. A gate position G through which a molten resin is to be injected for molding the lower case 2 is located, on the underside of the bottom portion 17, at a predetermined position near the end in the direction P and opposite to the axis of rotation K. The axis of rotation K passes through shaft holding holes 4 formed in the opposite lateral wall portions 9.

Figure 1A:
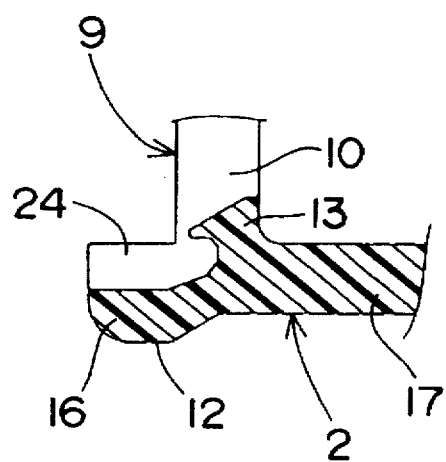
FIG. 1A is a section view of main portions of a lower case of a compact disc case according to an embodiment of the present invention and is a section view taken along the line 1A—1A in FIG. 3B.
Figure 1B:
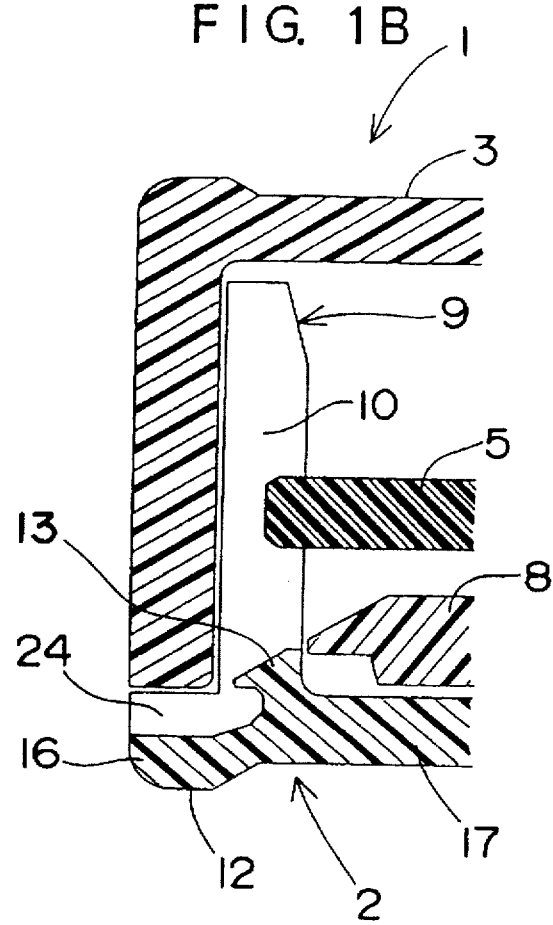
FIG. 1B is a section view of main portions of the disc case with the upper case closed.

Referring to FIG. 1A and FIG. 1B, each lateral wall portion 9 is provided substantially at the center thereof with a first recess 10, receding downwardly, which enables an user to readily apply his or her fingers to the disc 5 when it is intended to remove the disc 5 held on the tray 8 therefrom. Because of the presence of the first recess 10, only a part of a base portion 13 remains in each of the lateral wall portions 9 as shown in FIG. 1A.

Second recesses 24 are formed in the lateral edge portions 16 at their parts adjacent to the first recesses 10. Each second recess 24 is formed in the top of each lateral edge portion 16. Each lateral edge portion 16 includes a projecting portion 12 which downwardly projects to a position lower than the bottom portion 17. The projecting portions 12 work to protect the bottom portion 17.

According to this embodiment, the second recesses 24 are formed to prevent the lateral edge portions 16 from relatively increasing in thickness as compared with the bottom portion 17. Accordingly, at the time of molding, there is no difference in shrinkage produced between the lateral edge portions 16 and the bottom portion 17. This restrains the bottom portion 17 from being warped due to the difference in shrinkage.

Figure 4A:
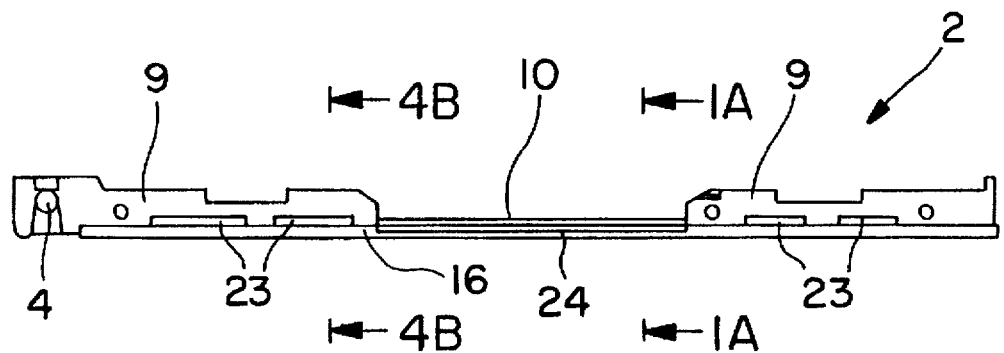
FIG. 4A is a side view of the lower case according to another embodiment of the present invention.
Figure 4B:
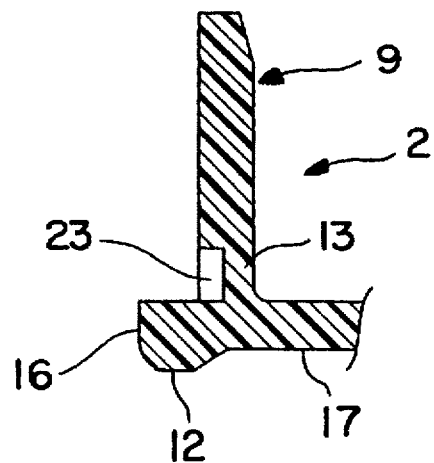
FIG. 4B is a section view taken along the line 4A—4A in FIG. 4A.

Another embodiment of the present invention is shown in FIG. 4A, FIG. 4B and FIG. 5. With reference to FIG. 4A and FIG. 4B, this embodiment is different from the embodiment shown in FIG. 3B in the following point. That is, a plurality of second recesses 23 each having a predetermined depth are formed in the outer surface of a base portion 13 of each lateral wall portion 9. Other arrangement including first recesses 10 and second recesses 24, is similar to that of the embodiment shown in FIG. 3B. Thus, the description thereof is here omitted with the same reference numerals used also in FIG. 4. Further, a view in section taken along the line 1A—1A in FIG. 4A is the same as that shown in FIG. 1A. Thus, the illustration thereof is also omitted.

Figure 16:
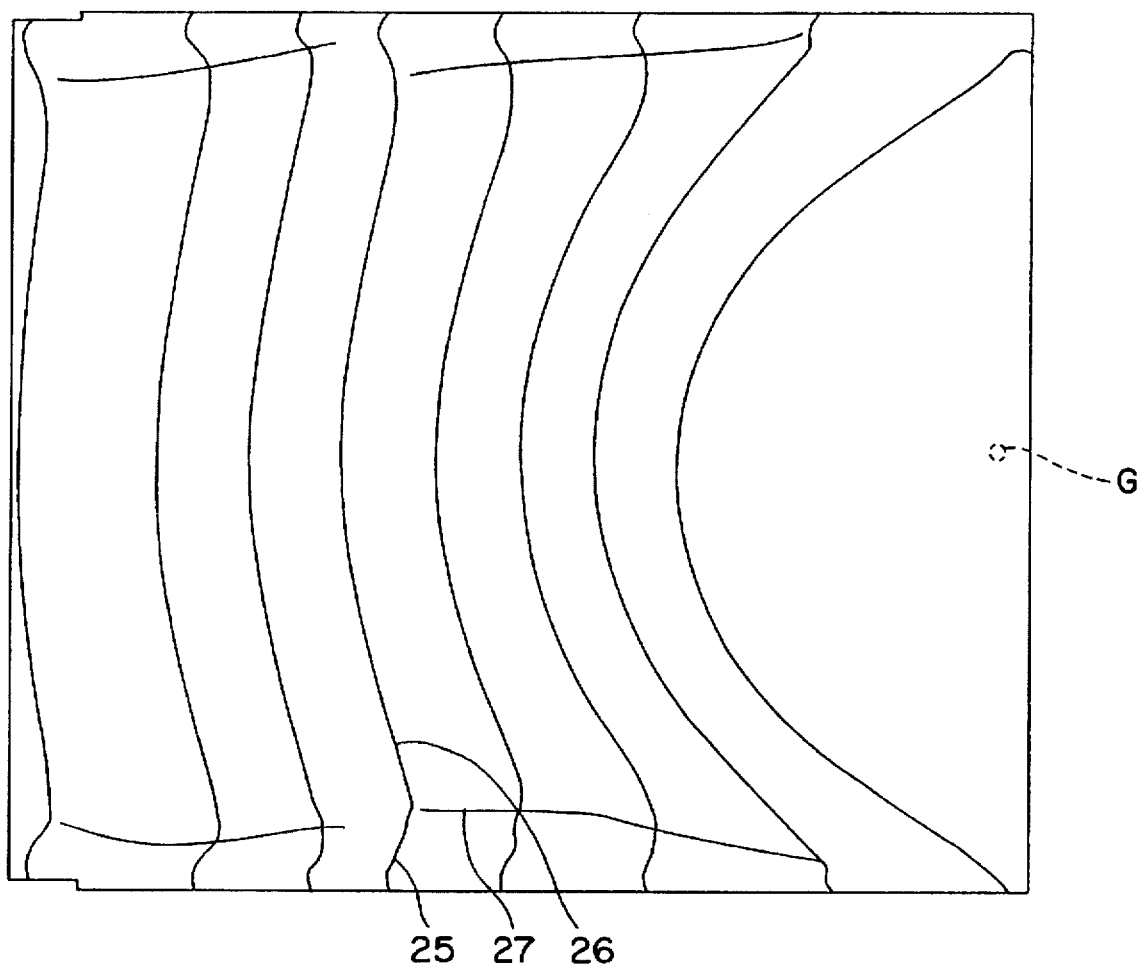
FIG. 16 is a schematic plan of the bottom portion illustrating the flow of a molten resin at the time of molding according to prior art.

FIG. 5 shows the flow of a molten resin in the molding cavity at the time of molding according to this embodiment. Comparison is now made between the resin flow in FIG. 5 and the conventional resin flow in FIG. 16. From FIG. 5, it is understood that a pushed-back molten resin 25 is very low in level as compared with a molten resin 26 directly advancing from a gate position G in a bottom portion 17 as if describing arcs. In an actually molded article, the bottom portion 17 presented no visible weld-lines.

According to this embodiment, the following operation and effect are produced. The second recesses 23 lower the flowability of the molten resin flowing from the gate into the lateral wall portions 9 through the bottom portion 17. This lowers the speed at which the molten resin flows into the lateral wall portions 9. As a result, this restrains the occurrence of the molten resin pushing-back phenomenon which has been the trouble in prior art; that is, the phenomenon that the overflowing molten resin is pushed back from the lateral wall portions 9 toward the bottom portion 17 because of an increase in the flowability of the molten resin at the lateral wall portions 9 each having a thickness thicker than that of the bottom portion 17.

Figure 11:
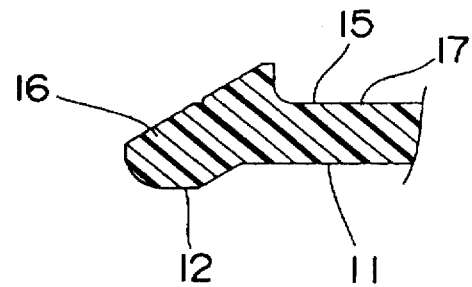
FIG. 11 is a section view taken along the line 11—11' in FIG. 9B.
Figure 12:
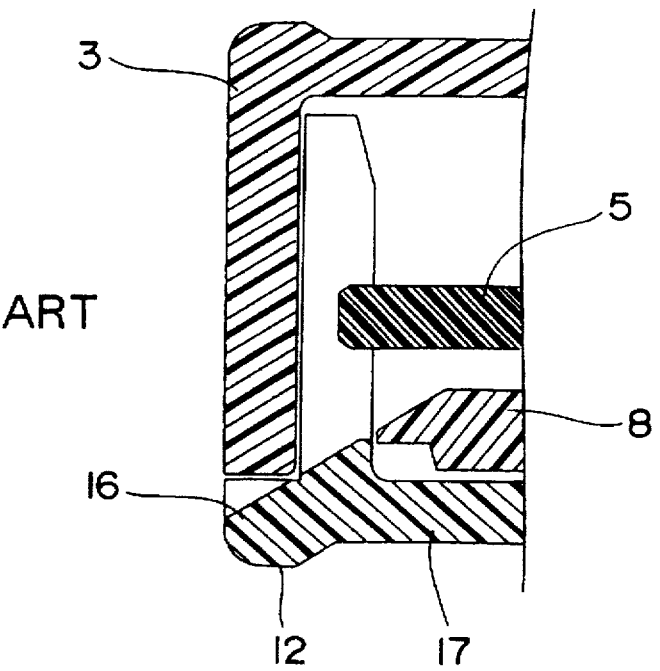
FIG. 12 is a section view, taken along the line 11—11' in FIG. 9B, in the case in which the tray and the disc are housed with the upper case closed.
Figure 13:
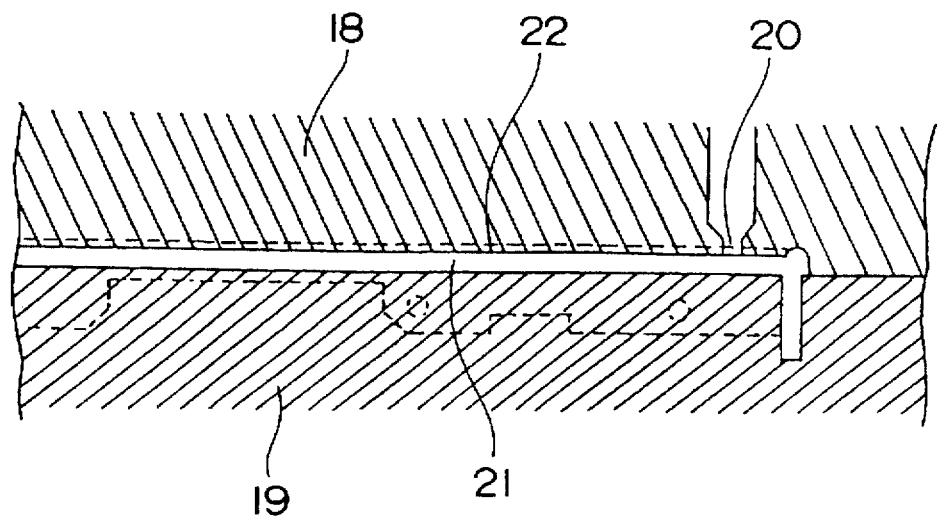
FIG. 13 is a section view of main portions of molds used for molding the lower case in FIG. 9A and FIG. 9B.
Figure 14:
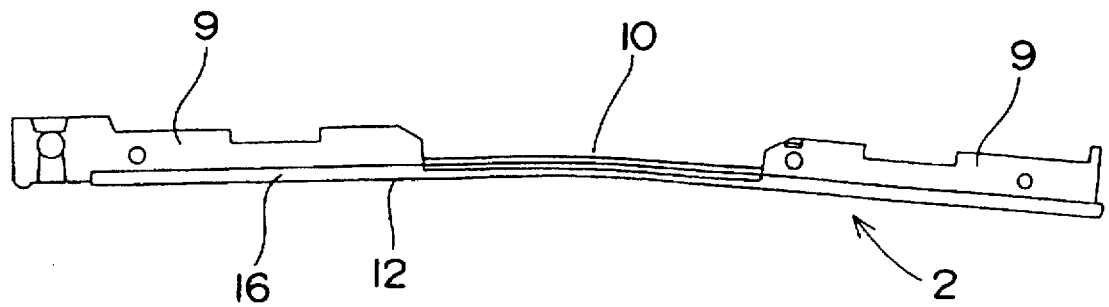
FIG. 14 is a side view of a warped lower case according to prior art.
Figure 15A:
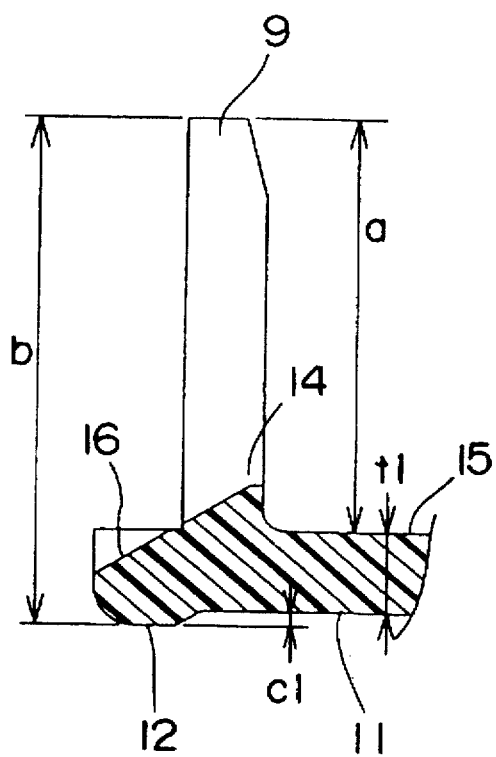
Figure 15B:
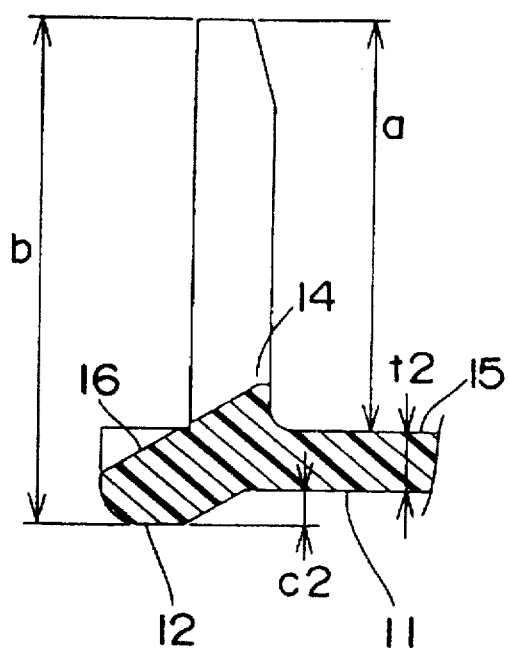

Further, second recesses 24 formed as corresponding to the first recesses 10, also contribute to a restraint of the molten resin pushing-back phenomenon. This is because the thickness of each lateral edge portion 16 can be made thinner than that of the conventional lateral edge portion shown in FIG. 11. More specifically, as apparent from FIG. 11, each lateral edge portion 16 increases in thickness in the vicinity of each first recess 10, and this produces the pushing-back phenomenon. In this embodiment, however, each lateral edge portion 16 can be reduced in thickness as shown in FIG. 1A. This restrains the resin from being increased in flowability at each lateral edge portion 16, thus restraining the occurrence of the pushing-back phenomenon.

In the embodiment shown in FIG. 4A, a pair of second recesses 23 separated from each other are formed in each lateral wall portion 9. The purpose of the separation is to prevent each lateral wall portion 9 from being lowered in strength due to the formation of such recesses. If there is no trouble in view of strength, a continuous concavity may be formed or three or more recesses may also be formed. The foregoing may apply also to the second recesses 24.

Each of FIG. 6A, FIG. 6B, FIG. 6C and FIG. 6D shows each of further embodiments of the present invention. In the embodiment in FIG. 6A, each lateral edge portion 16 has a second recess 24a communicating with a first recess 10 in each lateral wall portion 9. In this embodiment, each base portion 13 is reduced to half in thickness.

Figure 6A:
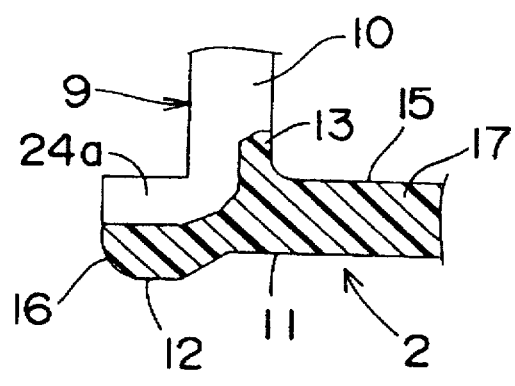
FIG. 6D is a section view of main portions of a lower case of a compact disc case according to each of further embodiments of the present invention.
Figure 6B:
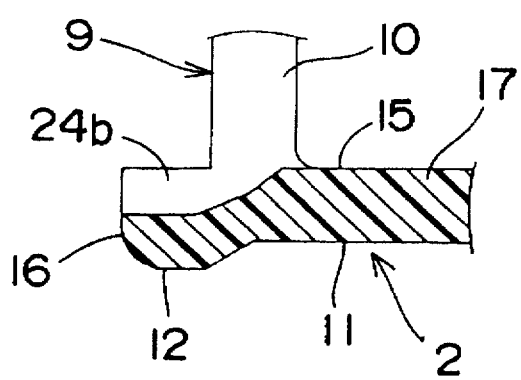

In the embodiment in FIG. 6B, a second recess 24b is formed in each lateral edge portion 16 such that the corresponding part of a base portion 13 of each lateral wall portion 9 is perfectly eliminated.

Figure 6C:
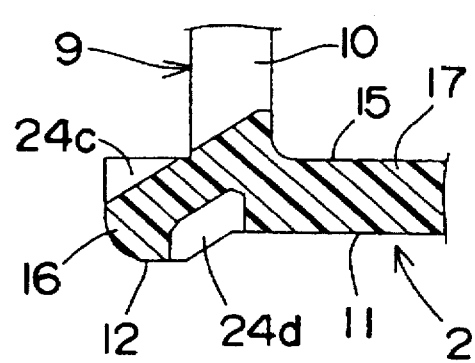

In the embodiment in FIG. 6C, a second recess 24c having a triangular shape in section is formed in the top of each lateral edge portion 16, and another second recess 24d is formed in the underside of each lateral edge portion 16 at its position opposite to each first recess 10.

Figure 6D:
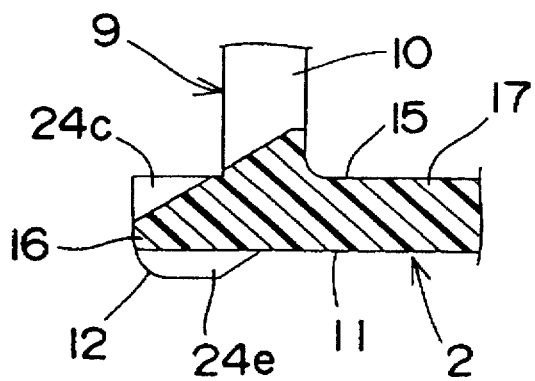

In the embodiment in FIG. 6D, a second recess 24c having a triangular shape in section is formed in the top of each lateral edge portion 16, and another second recess 24e is formed such that each lateral edge portion 16 is deficient in a projecting portion 12 only at its part corresponding to each first recess 10.

In each of the embodiments in FIG. 6A, FIG. 6B, FIG. 6C and FIG. 6D, each of the second recesses 24a to 24e prevents the bottom portion 17 from being warped. Particularly, in the embodiment in FIG. 6D, the lower case 2 is deficient in the downwardly projecting portions 12. This further prevents the bottom portion 17 from being excessively shrunk due to difference in shrinkage. This more securely prevents the bottom portion 17 from being warped.

Figure 7A:
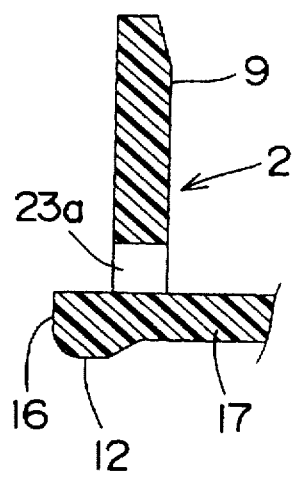
FIG. 7C is a section view of main portions of a lower case of a compact disc case according to each of still further embodiments of the present invention.
Figure 7B:
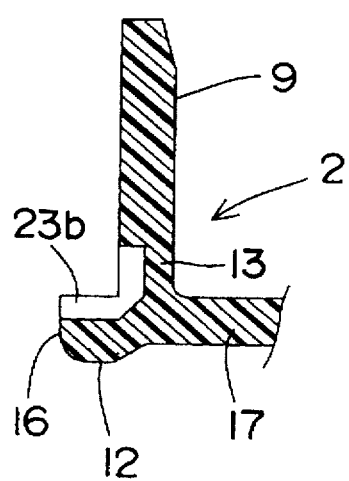
Figure 7C:
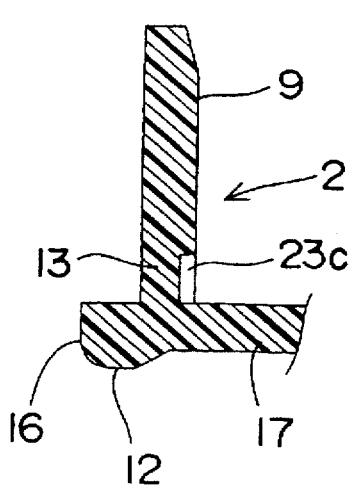
Figure 8:
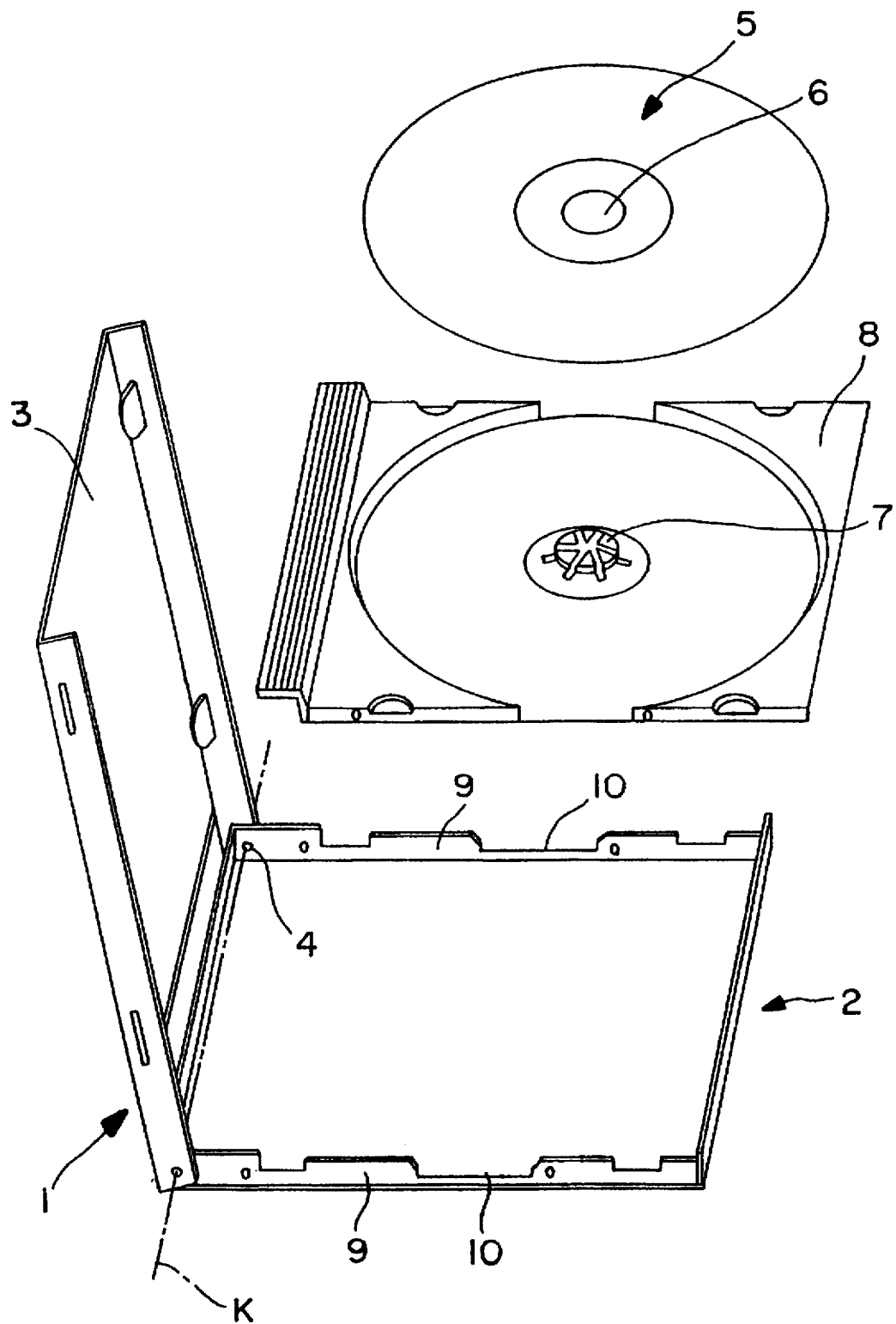
FIG. 8 is an exploded perspective view schematically illustrating the arrangement of a usual compact disc case of prior art and a compact disc.
Figure 9A:
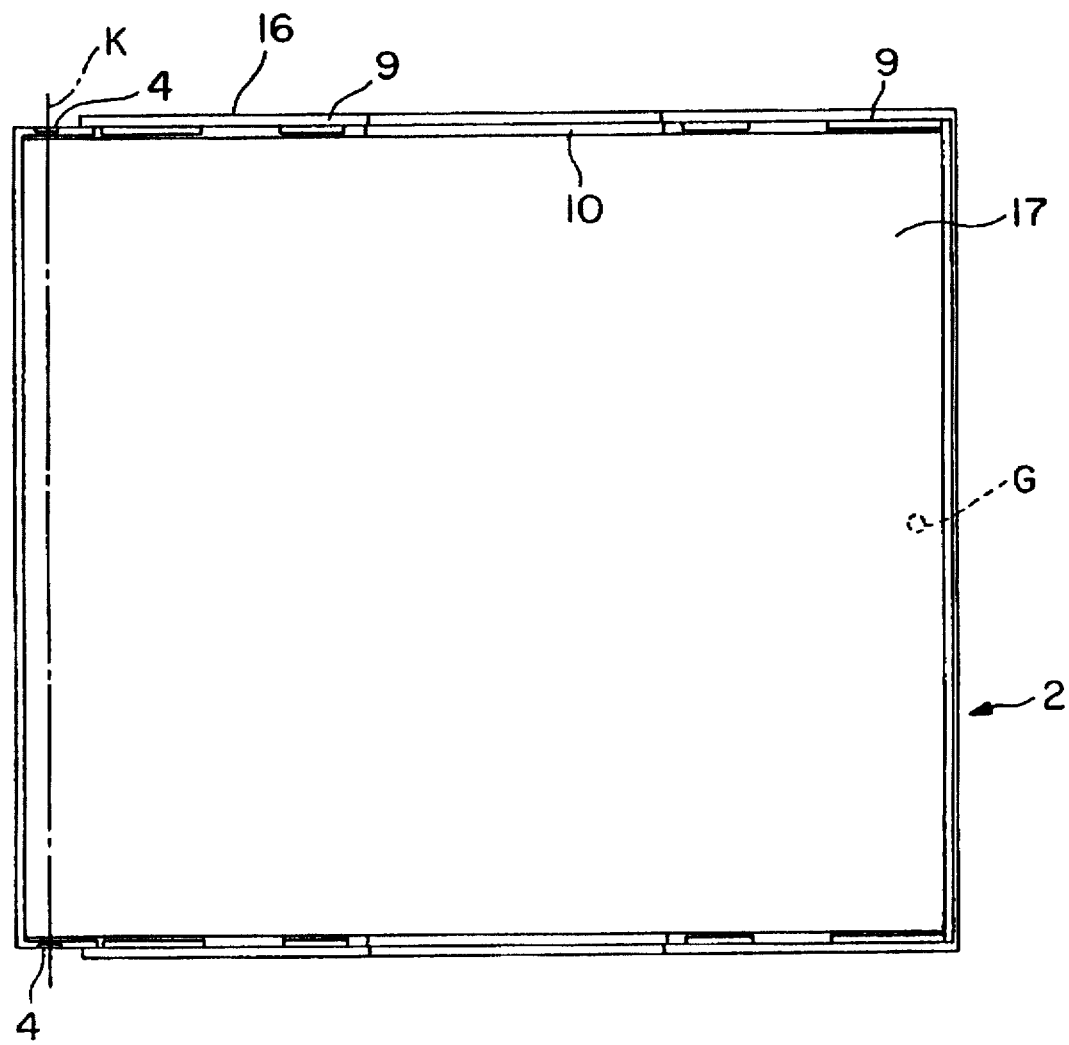
FIG. 9A and FIG. 9B are a plan and side view of the lower case of the usual compact disc case of prior art.
Figure 9B:
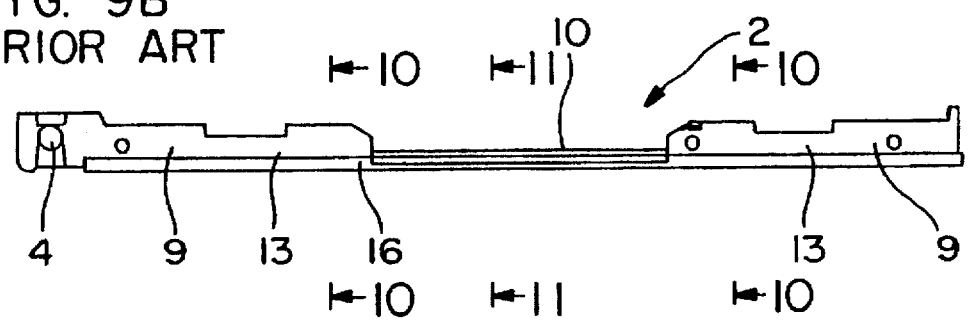
Figure 10:
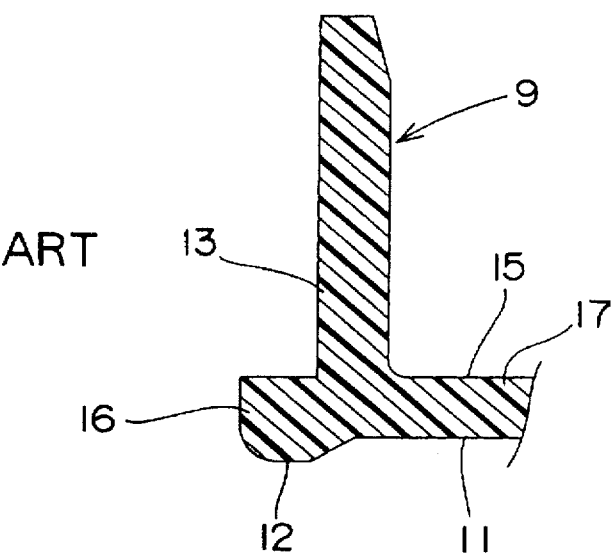
FIG. 10 is a section view taken along either of the lines 10—10' in FIG. 9B.

In each of the embodiments in FIG. 6A, FIG. 6B, FIG. 6C and FIG. 6D, the warping prevention effect produced by each of the second recesses 24a to 24e is obtained by the elimination of a difference in molding resin shrinkage resulting from a difference in thickness. Accordingly, this has nothing to do with the gate position thorough which a molten resin is to be injected into the molding cavity. Each of FIG. 7A, FIG. 7B and FIG. 7C is a section view according to each of still further embodiments of the present invention. In these embodiments, a variety of modifications are made on the second recesses in the base portions of the lateral wall portions 9.

In the embodiment in FIG. 7A, each second recess is formed by a through-hole 23a which passes through the lateral wall portion 9.

In the embodiment in FIG. 7B, each second recess 23b is formed as extending over the lateral edge portion 16 and the base portion 13 of the lateral wall portion 9.

In the embodiment in FIG. 7C, each second recess 23c is formed in the inner surface of each lateral wall portion 9. In addition to the embodiments above-mentioned, a variety of modifications of the present invention may be made.

The second recess may include at least one recess 23, 23a, 23b, 23c, 24, 24a, 24b, 24c, 24d, 24e formed in at least one portion out of base portions of the lateral wall portions 9 and the lateral edge portions 16.

The foregoing description has been made of each of the embodiments above-mentioned based on the assumption that the gate position G for injecting a resin is set in the bottom portion 17 substantially at the center in a direction Q parallel with the axis of rotation K, as shown in FIG. 5. However, there are instances where the gate position G is set at a position shifted from the center in the direction Q. In such cases, the weld-lines do not always appear symmetrically with respect to a center line 100 (See FIG. 5) along the direction P perpendicular to the axis of rotation K, but may appear only at one left or right side. When the present invention is applied to such an arrangement, recesses may be formed only in specific parts of the lateral wall portions 9 or the lateral edge portions 16 corresponding to the first recesses 10 such that the effect is maximized according to the gate position shifted from the center in the direction Q.

In each of the embodiments above-mentioned, the description has been made of the type in which a compact disc is housed through a tray. However, the present invention may also be applied to the type where a disc is directly held and housed in the container without the use of a tray, or where a plurality of discs are housed in a single disc case.

I claim:

1. In a lower case of a compact disc case, which is to be molded by injecting a molten resin through a predetermined gate position and which has an axis of rotation around which an upper case is rotatably supported, the lower case comprising:

a rectangular bottom portion;

a pair of upwardly extending lateral wall portions respectively formed at a pair of sides, out of the four sides of the bottom portion, extending in a direction perpendicular to the axis of rotation;

outwardly projecting lateral edge portions respectively formed at the pair of sides of the bottom portion;

a first recess formed in a predetermined part of each of the lateral wall portions, the first recess receding such that a top end of the first recess thereof substantially reach a top of the bottom portion; and at least one second recess formed in at least one portion out of base portions of the lateral wall portions and the lateral edge portions, each of the lateral edge portions including a projecting portion which downwardly projects to a position lower than the bottom portion.

2. A lower case of a compact disc case according to claim 1, wherein the gate position is shifted from the center in a direction of the bottom portion to a position in the direction, the direction being normal to the axis of rotation.

3. A lower case of a compact disc case according to claim 2, wherein the gate position is set at an end in the direction of the bottom portion.

4. A lower case of a compact disc case according to claim 1, wherein the second recess includes a recess formed in an outer surface of one of the base portions of the lateral wall portions.

5. A lower case of a compact disc case according to claim 1, wherein the second recess includes a recess formed in an inner surface of one of the base portions of the lateral wall portions.

6. A lower case of a compact disc case according to claim 1, wherein the second recess includes a through-hole passing through one of the base portions of the lateral wall portions.

7. A lower case of a compact disc case according to claim 1, wherein the second recess includes a recess extending over a top of one of the lateral edge portions and the corresponding base portions of the lateral wall portions.

8. A lower case of a compact disc case according to claim 1, the second recess includes a recess formed in a predetermined part of each of the lateral edge portions at its position corresponding to one of the first recesses.

9. A lower case of a compact disc case according to claim 8, wherein the second recess includes a recess formed in a top of each of the lateral edge portions.

10. A lower case of a compact disc case according to claim 8, wherein the second recess includes (i) a recess formed in a top of each of the lateral edge portions and (ii) a recess formed in an underside of each of the projecting portions.

11. A lower case of a compact disc case according to claim 8, wherein the second recess includes a recess continuous to the first recess.

* * * * *